(12) United States Patent
Bisdikian et al.

(10) Patent No.: US 8,675,475 B2
(45) Date of Patent: Mar. 18, 2014

(54) TECHNIQUES FOR RECOVERY OF WIRELESS SERVICES FOLLOWING POWER FAILURES

(75) Inventors: Chatschik Bisdikian, Chappaqua, NY (US); Bong Jun Ko, Harrington Park, NJ (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 13/214,818

(22) Filed: Aug. 22, 2011

(65) Prior Publication Data
US 2013/0051216 A1 Feb. 28, 2013

(51) Int. Cl.
*G01R 31/08* (2006.01)

(52) U.S. Cl.
USPC .................. 370/218; 370/242; 714/3

(58) Field of Classification Search
USPC ................ 370/216–220, 226, 241–246, 248; 714/1–3, 4.2, 4.21, 4.3, 4.4; 340/3.1, 340/3.43, 3.44; 455/423–425, 67.11
See application file for complete search history.

(56) References Cited

U.S. PATENT DOCUMENTS

| 6,577,882 | B1 | 6/2003 | Roos | |
|---|---|---|---|---|
| 2009/0270132 | A1 | 10/2009 | Nakayama | |
| 2009/0280853 | A1 | 11/2009 | Brisebois et al. | |
| 2009/0304055 | A1 | 12/2009 | Nino et al. | |
| 2009/0320100 | A1 | 12/2009 | Kitazoe | |
| 2010/0159991 | A1 | 6/2010 | Fu et al. | |
| 2011/0128060 | A1* | 6/2011 | Ishino et al. | 327/262 |
| 2012/0047551 | A1* | 2/2012 | Pattar et al. | 726/1 |
| 2012/0142336 | A1* | 6/2012 | Van Phan et al. | 455/423 |
| 2012/0264470 | A1* | 10/2012 | Bajj et al. | 455/509 |

FOREIGN PATENT DOCUMENTS

| WO | WO0122716 A1 | 3/2001 |
|---|---|---|
| WO | WO2011078646 A1 | 6/2011 |

OTHER PUBLICATIONS

"Is It a Picocell? Is It a Femtocell?" ABIresearch. Nov. 13, 2008.*
English Abstract of CN1719917A, filed by Shao; ZTE Corp., published Jan. 11, 2006.
English Abstract of CN101477403, filed by Cuinan; Langchao Electronic Inf. Ind., published Jul. 8, 2009.

* cited by examiner

*Primary Examiner* — Kerri Rose
(74) *Attorney, Agent, or Firm* — Jennifer R. Davis; Michael J. Chang, LLC

(57) ABSTRACT

Techniques for managing a wireless network when disruptive events occur are provided. In one aspect, a method for managing a heterogeneous wireless network having at least two classes of nodes is provided. The method includes the following steps. One or more network signaling activities are observed. If the network signaling activities exhibit a behavior that is associated with a power failure affecting at least one of the classes of nodes, network resources for transmission and processing of network signaling associated with one or more other of the classes of nodes are adjusted to accommodate the behavior.

25 Claims, 5 Drawing Sheets

100

TECHNIQUES FOR RECOVERY OF WIRELESS SERVICES FOLLOWING POWER FAILURES

FIELD OF THE INVENTION

The present invention relates to wireless networks and more particularly, to techniques for managing a wireless network when disruptive events, such as a power failure, occur.

BACKGROUND OF THE INVENTION

With the introduction of consumer-owned/home-installed femtocell access points (FAP), power failures may have a severe impact on wireless service operations as home-installed FAPs do not have the luxury of power back-ups that regular macrocell transmitter systems have. If unable to connect to the mobile network infrastructure through FAPs (due to a disruptive event such as a power failure), the customer devices (e.g., cell phones) attempt to switch their over-the-air connections to those served by macrocells, so as to maintain the active connection (i.e., vertical handoff for active communication sessions) or to simply notify the cellular service provider of the change in their "points of attachment" (i.e., location update by inactive devices). Similar procedures would occur, in the reverse way, upon the restoration of the femtocell connection.

Hence, upon power failure, and later on upon recovery, there is a flood of actions required by the customer devices (e.g., cell phones) originally serviced by the FAPs and later on the FAPs that come back to live at the same time. Such situations can stress back-end operations trying to process a flood of requests (e.g., for reconfiguration or phone handoffs).

There currently exists no teaching directed to dealing with the impact of femtocell related-operations due to power loss and recovery. Thus, techniques for femtocell recovery following a disruptive event such as a power failure would be desirable.

SUMMARY OF THE INVENTION

The present invention provides techniques for managing a wireless network when disruptive events, such as a power failure, occur. In one aspect of the invention, a method for managing a heterogeneous wireless network having at least two classes of nodes is provided. The method includes the following steps. One or more network signaling activities are observed. If the network signaling activities exhibit a behavior that is associated with a power failure affecting at least one of the classes of nodes, network resources for transmission and processing of network signaling associated with one or more other of the classes of nodes are adjusted to accommodate the behavior.

A more complete understanding of the present invention, as well as further features and advantages of the present invention, will be obtained by reference to the following detailed description and drawings.

DETAILED DESCRIPTION OF PREFERRED EMBODIMENTS

Figure 1:
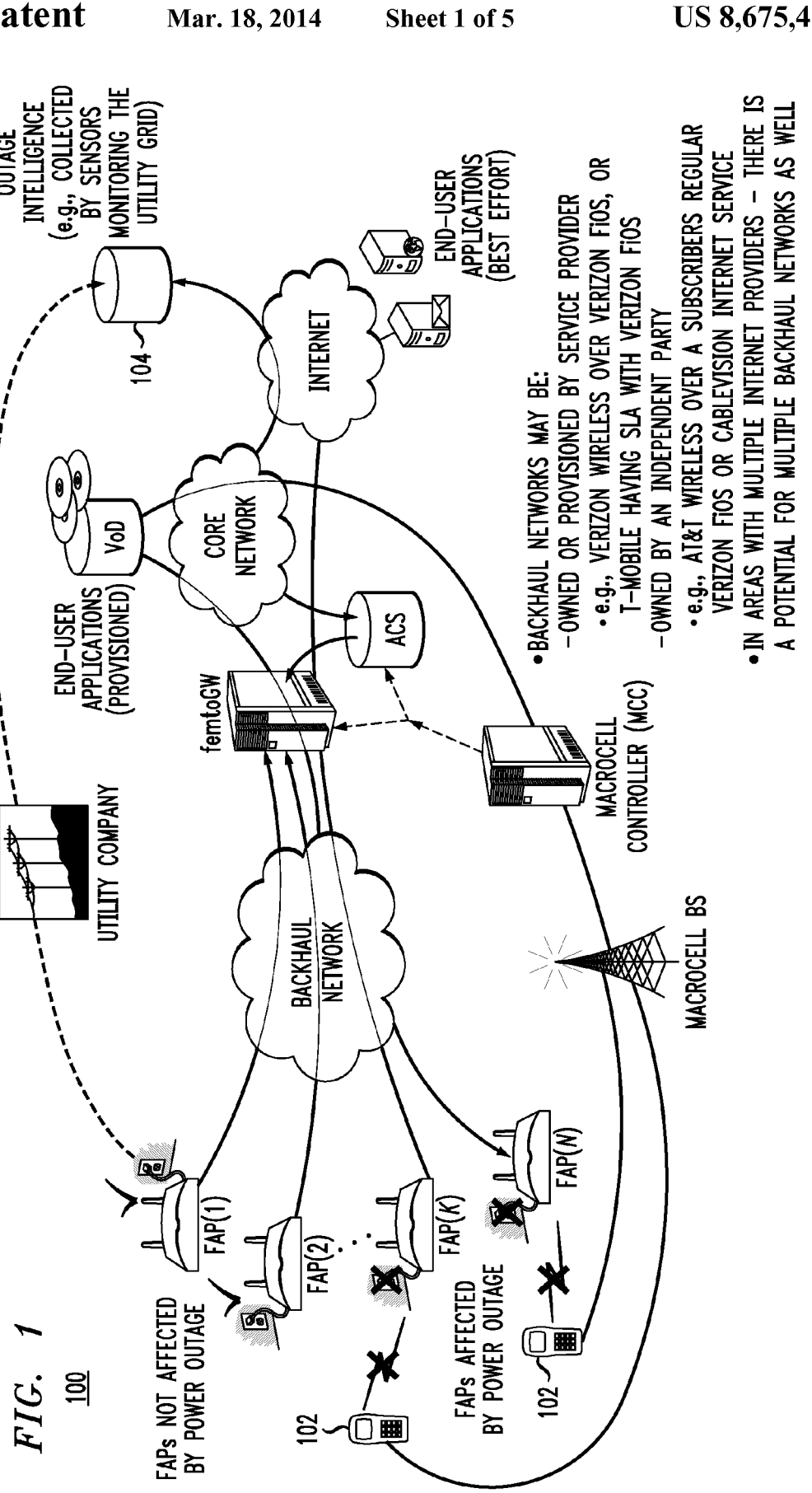
FIG. 1 is a diagram illustrating an exemplary heterogeneous wireless network having at least two classes of nodes according to an embodiment of the present invention.

Provided herein are techniques for recovery of wireless service following a disruptive event, such as a power failure. FIG. 1 is a diagram illustrating an exemplary heterogeneous wireless network 100 having at least two classes of nodes. Each class represents a collection of functionally equivalent nodes (e.g., femtocell access points) to which and over which the network operator has varying degrees of access and control. For example, one class of nodes may reside in subscriber homes and, hence, be beyond the immediate control of the network operator, while another class of nodes may reside in the operator's network and hence be fully accessible by the network operator. As will be apparent from the following description, the classes of nodes that may be associated with a disruptive event include customer premise equipment (CPE) (i.e., communication related equipment that resides in a customer's premises and is often owned by the customer, such as femtocell access points, modems, set-top boxes, etc.) and operator-owned equipment, such as femto gateway controllers, auto configuration server, etc.). Network 100 contains a core network that user equipment 102 (e.g., cell phones, PDAs, laptop computers, etc.) can access through a subnetwork of femtocell access points (FAPs 1 ... N), either directly or through a backhaul network. The use of a backhaul network as a link between a core network and subnetworks is known to those of skill in the art and thus is not described further herein. User equipment 102 may also access the Internet and its best effort services (i.e., without guarantees on delay and bandwidth) like e-mail and on-line purchasing via the backhaul network. The backhaul network may be owned or provisioned by the service provider (e.g., Verizon wireless over Verizon FiOS or T-Mobile® having a service level agreement (SLA) with Verizon FiOS) or the backhaul network may be owned by an independent party (e.g., AT&T Wireless over a subscriber's regular Verizon FiOS or Cablevision internet service). In areas with multiple Internet Service Providers (ISPs) there is the potential for multiple backhaul networks as well.

The backhaul network may be linked to the core network through a femto gateway (femtoGW) controller and auto configuration server (ACS). The ACS is used by the wireless services operators to configure and manage remotely the FAPs and relates to discovering and registering an FAP residing at a customer's home with the operator, setting operational parameters of the FAP (such as transmit power and frequency of operation), download upgrades and reboot and/or reset the FAP. It is through the core network that user equipment 102 can access (provisioned) end-user applications such as videos on demand (VoD). The backhaul network is under the control of the femto gateway controller which, as will be described in detail below, can be instrumental in recovery efforts after a power failure once power has been restored.

The term "operator" as used herein, refers to the computing equipment and processes the "network provider" (or "network operator") uses, like (FemtoGW, macrocell controller (MCC)), for the steps described herein. An exemplary apparatus that may be configured to serve as the operator computing equipment and to perform one or more of the methodologies presented herein is provided in FIG. 5, described below.

When a disruptive event, such as a power failure occurs, user equipments' connection to the network through FAPs are lost. As highlighted above, unlike macrocells, FAPs are generally not provisioned with a back-up power source. A typical power outage affects a certain geographical area, covering a subsection of the FAPs accessing a common backhaul network. See, for example, FIG. 1 wherein the FAPs not affected by the power outage have a check mark while those affected by the power outage are marked with an X indicating that they are off-line (e.g., have lost power due to a power outage).

When the power goes out, the user equipment associated with the affected FAPs will attempt to switch over to an available macrocell. This action is commonly referred to as a vertical handoff request (VHR) for the user equipment having active data connections, or as a location update (LU) for the user equipment without active connections. The macrocell network contains a macrocell base station (macrocell BS) which receives the signals directly from the user equipment 102 and connects the user equipment to one or more end-user applications. For ease of depiction, only one macrocell base station is shown in FIG. 1. However it is to be understood that multiple macrocell base stations may be present and may be accessed by the user equipment. Thus the user equipment can access the core network through the macrocell BS. Namely, FIG. 1 shows users connecting to services some of which are provisioned (i.e., requiring quality of service (QoS) such as video-on-demand (VoD)) and some of which are best effort (no QoS guarantees). Users access either of these services through their devices no matter if they use FAPs or macrocell BS connection. In the specific example shown in FIG. 1, a "FAP user" is connecting to provisioned services while a "macrocell user" is connecting to best effort services. However, this is merely exemplary and it can be the other way around, i.e., the "FAP user" is connecting to best effort services while the "macrocell user" is connecting to provisioned services, or any other combination. The macrocell base station is linked to and under the control of a macrocell controller (MCC) which, as will be described in detail below, can be instrumental in recovery efforts after a power failure.

As will be described in detail below, once a power failure has occurred, information relating, for example, to the extent of the outage and/or to when and where the power is going to be restored can be used to proactively provision resources related to outage or recovery events. This information (outage intelligence) could be obtained from the power supplier (i.e., the utility company, see FIG. 1). By way of example only, the utility company can provide this outage intelligence through a database (e.g., database 104) that may be accessed by the core network for example via the internet. By way of example only, outage intelligence can be collected by the utility company from sensors that utility operators install on their utility grids to monitor the operation of the grid, e.g., how much electric energy goes through a particular cable on the grid, so as to better manage the utility distribution (this is sometimes referred to as "smart grid" technology).

Techniques for managing a wireless network, such as network 100, will now be described. In particular, the processes described herein will focus on the flurry of activities surrounding a disruptive event such as during a power failure or after a power failure once power has been restored. Taking network 100 as an example, when a power failure occurs network access through the FAPs affected by the outage is cut off. Accordingly, there is an abrupt increase in activity as the related user equipment attempt to switch connections from the FAPs to the macrocell network. When power is restored there is also an abrupt increase in activity as the FAPs come back online. These increased periods of activity are referred to herein as signaling events since they signal the occurrence of a disruptive event like a power failure or the restoration of power following a power outage.

Figure 2:
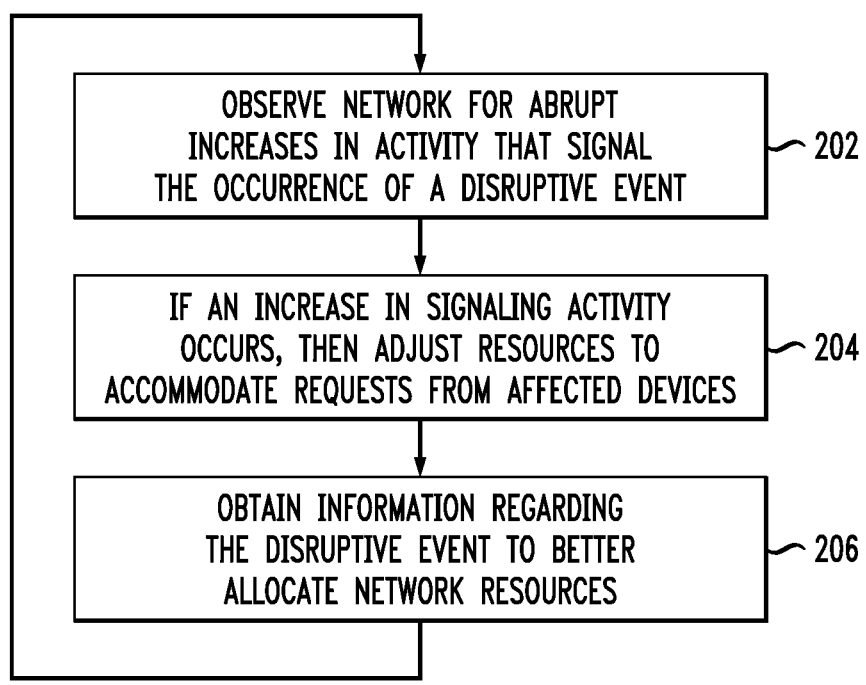
FIG. 2 is a diagram illustrating an exemplary methodology for managing a heterogeneous wireless network during a disruptive event according to an embodiment of the present invention.

FIG. 2 is a diagram illustrating exemplary methodology 200 for managing a heterogeneous wireless network having at least two classes of nodes (e.g., customer premise equipment and operator-owned equipment), such as network 100, during a disruptive event, such as a power failure or after a power failure when power is restored. In step 202, the network is observed for activities that exhibit a certain behavior, such as an abrupt increase in activities that are associated with a disruptive event (signaling events) involving one of the classes of nodes. These are network activities that generally take place after a disruptive event has occurred. By way of example only, in the case of a power failure, the network may be observed for an abrupt increase in the frequency of vertical handoff requests (VHRs) and location updates (LUs) that occur as affected user equipment attempt to switch from a lost FAP connection to the macrocell network (i.e., connection is transferred to the macrocell network). See, for example, FIG. 3 described below. In this instance, the disruptive event involves (i.e., affects) the class of nodes which includes customer premise equipment. Similarly, when power is restored, the network may be observed for an abrupt increase in the frequency of reboot requests (RRs) that occurs when the FAPs come back online. See, for example, FIG. 4 described below. In this instance, the power restoration involves (i.e., affects) the class of nodes which includes operator-owned equipment.

In the absence of any signaling events, operation of the network is conducted as usual. However, if an increase in the frequency of activity indicative of a disruptive event affecting at least one of the classes of nodes occurs, then in step 204, resources for transmission and processing of network signaling associated with one or more of the other classes of nodes are adjusted to accommodate this behavior, e.g., to accommodate the increased frequency of activity. Thus, in the instance where the disruptive event affects the customer premise equipment, the resources for transmission and processing of network signaling associated with the operator-owned equipment class of nodes are adjusted. Conversely, in the instance where the disruptive event affects the operator-owned equipment, the resources for transmission and processing of network signaling associated with the customer premise equipment class of nodes are adjusted. For example, in the case of a power outage, resources for transmission and processing of network signaling may be adjusted to accommodate the increased number of requests by user equipment to switch to the macrocell network. See, for example, FIG. 3 described below. In the case of power restoration following an outage, resources for transmission and processing of network signaling may be adjusted to accommodate the increased number of reboot requests from FAPs that are powering up after the outage. See, for example, FIG. 4 described below.

Optionally, in step 206, information regarding the disruptive event may be obtained in order to better allocate the resources (as per step 204). For example, information regarding a power outage, such as the extent of the outage (e.g., how large of a geographic area is affected by the outage) and/or when the power might be restored, may be obtained in this step. This type of information may be obtained directly from the utility company. This information is useful in helping to estimate and predict when, where, and how much the adjustment to the resources for transmission and processing of network signaling is needed.

Once the disruptive event has passed, monitoring/observing for the next disruptive event can commence as shown in FIG. 2. The details of the present techniques in the context of a power outage are described in conjunction with the description of FIG. 3, below. The details of the present techniques in the context of restoration of power after a power outage are described in conjunction with the description of FIG. 4, below. A power outage and recovery after an outage are being used herein merely as examples of disruptive events.

Figure 3:
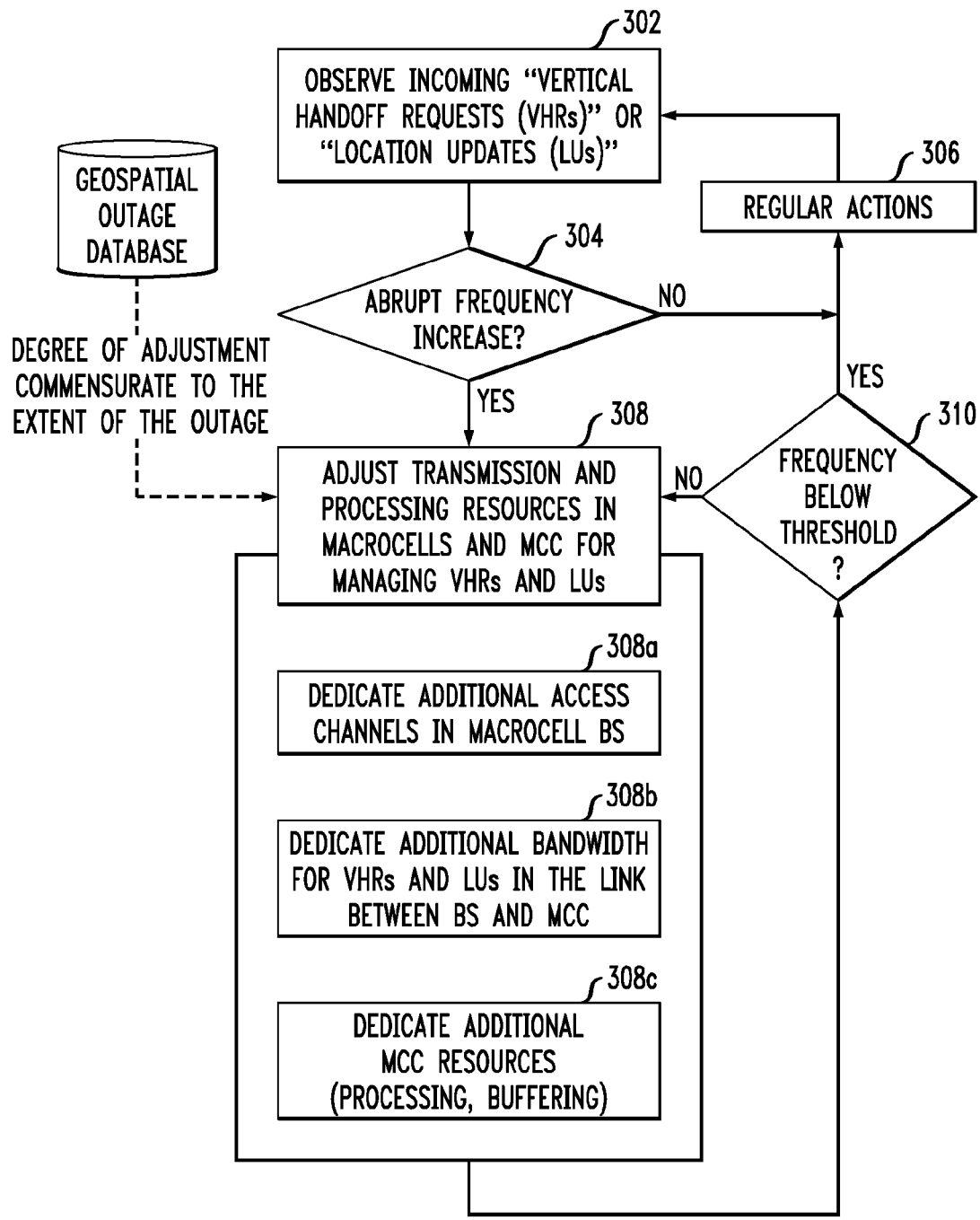
FIG. 3 is a diagram illustrating an exemplary methodology for managing a heterogeneous wireless network after a power failure according to an embodiment of the present invention.

FIG. 3 is a diagram illustrating exemplary methodology 300 for managing a heterogeneous wireless network having at least two classes of nodes (e.g., customer premise equipment (e.g., FAPs) and operator-owned equipment (e.g., femto gateway controllers, ACS, etc.)), such as network 100, after a power failure. Methodology 300 follows the same general process flow as methodology 200 (of FIG. 2). Using network 100 as an example, the steps of methodology 300 may be performed by the macrocell controller (MCC) since, upon the occurrence of a power failure, requests will be made to switch to the macrocell network. The macrocell controller (MCC) processes these requests. An exemplary apparatus that may be configured to serve as the macrocell controller and to perform the steps of methodology 300 is provided in FIG. 5, described below.

As highlighted above, a certain behavior such as an increase in the frequency of certain activities in the network is indicative of the occurrence of a disruptive event. In this example, when a power failure occurs, and connection through the FAPs is lost (i.e., the FAPs go off-line, e.g., lose power due to a power outage), there is an abrupt increase in the frequency of VHRs and LUs as the user equipment request switchover to the macrocell to connect to the network. Thus, in step 302, the macrocell controller observes these network activities, i.e., incoming VHR and LU requests.

In step 304, a determination is made as to whether the frequency of incoming VHR and LU requests is above a certain threshold level. As highlighted above, a disruptive event such as a power failure would result in certain network activity behavior, such as an abrupt frequency increase in VHR and LU requests. According to an exemplary embodiment, an operator may collect long term statistics for VHR and LU requests and calculate parameters such as the mean frequency and standard deviation for these requests during normal operation (when no disruptive event has occurred) and/or following power interruptions. The collection of the long term statistics may be moving averages over windows anchored on current time or recurring intervals or combinations. An example of the former (i.e., current time) would be the case where statistics for requests are collected using the requests seen over the past one day, one week, one month, etc. An example of the latter (i.e., recurring intervals) would be the case where statistics are collected using the requests seen between 8:00 am and 8:10 am every Tuesday, or every first Tuesday of a month, etc., for the past, say, one year. The duration and the frequency of the observation intervals may change per the operator's desire. The benefit of the latter recurring, piecewise monitoring, is to gauge the request statistics reflective of the daily, monthly, seasonal, etc., trends.

Should the operator suddenly, say over a period of 30 seconds or 1 minute (as indicative of an abrupt increase) observe request frequencies that behave closer to the ones seen during interruptions, or request frequencies that exceed the normal long term averages, or the long term averages for the appropriate time interval by, for example, 2 standard deviations, the operator may declare that a disruptive event has occurred. Based on the common statistical methods, the value of 2 standard deviations implies that, statistically, there is less than a 2.5 percent (%) probability that what is observed is the result of heavy but otherwise normal traffic situation rather than something more severe (i.e., an outage). This value can be adjusted upward or downward at the operator's discretion.

If the frequency of VHR and LU requests is below the threshold (i.e., the observed network activity is not exhibiting behavior indicate of the occurrence of a disruptive event), then in step 306, the macrocell controller maintains normal network operations. On the other hand, whenever the frequency of VHR and LU requests increases above the threshold value (i.e., the observed network activity is exhibiting behavior indicate of the occurrence of a disruptive event), in step 308, the macrocell controller adjusts resources for transmission and processing of network signaling (e.g., in the macrocell base station and/or the macrocell controller) to accommodate the behavior, i.e., to accommodate the increased frequency of requests from those affected devices. This can be done in a number of ways. By way of example only, step 308 may itself include one or more steps 308a-c which may be performed independently and in any order to adjust resources for transmission and processing of network signaling. For example, in step 308a, the operator may allocate additional wireless access channels (e.g., frequency, times, or codes, depending on specific wireless transmission technology used in the air-interface between the macrocell BS and user equipments) for handling VHR and LU requests in the bases stations that are experiencing an abrupt increase in the access requests from user equipment. In step 308b, the operator can also dedicate an increased portion of the bandwidth of the link between macrocell BS and MCC for handling the access requests, and in step 308c the operator can dedicate additional processing capacity at the MCC, such as processing priority, message queues, and CPU cycles, for managing VHRs and LUs. As shown in FIG. 3, the adjustment in resources for transmission and processing of network signaling step may be supplemented by information regarding the outage obtained, for example, from the utility company. See also FIG. 2, described above. Information from the utility company may be accessible from a geospatial outage database, which as described above may be accessed by the core network for example via the internet. See description of FIG. 1, above. By way of example only, the information obtained from the utility company may provide guidance on the extent of the outage, e.g., the geographical area affected by the power outage, thus permitting the macrocell controller to better gauge how much of the resources should be reallocated to deal with the outage network activity (i.e., the greater the extent of the outage, the greater the number of incoming VHR and LU requests, and thus the greater the amount of resources that need to be allocated to deal with these requests). For example, upon learning that region A has experienced a power outage, the network operator can determine, from its own knowledge of where its service subscribers' premises are located, how many of them have been affected. If for example 1,000 of its subscribers are affected, then the network operator can use this number to estimate, say, using a queuing-based capacity model, how long it will take to accommodate their requests using different levels of allowable resources and select the level to use that provides satisfactory performance.

A determination is then made in step 310 as to whether the frequency of VHR and LU requests has fallen below the threshold value, see above, (signifying, e.g., that power has been restored and/or that the requests for handoffs have returned to normal because, for example, a majority of the requests have been handled). If the frequency of VHR and LU requests has fallen below the threshold value, then the macrocell controller switches the resources for transmission and processing of network signaling back to normal operation parameters, and regular actions are resumed as per step 306. If, however, the frequency of VHR and LU requests is still above the threshold value, then the adjusted resources for transmission and processing of network signaling are maintained or updated (based, for example, on updated information from the outage database related to the extent of the outage).

Figure 4:
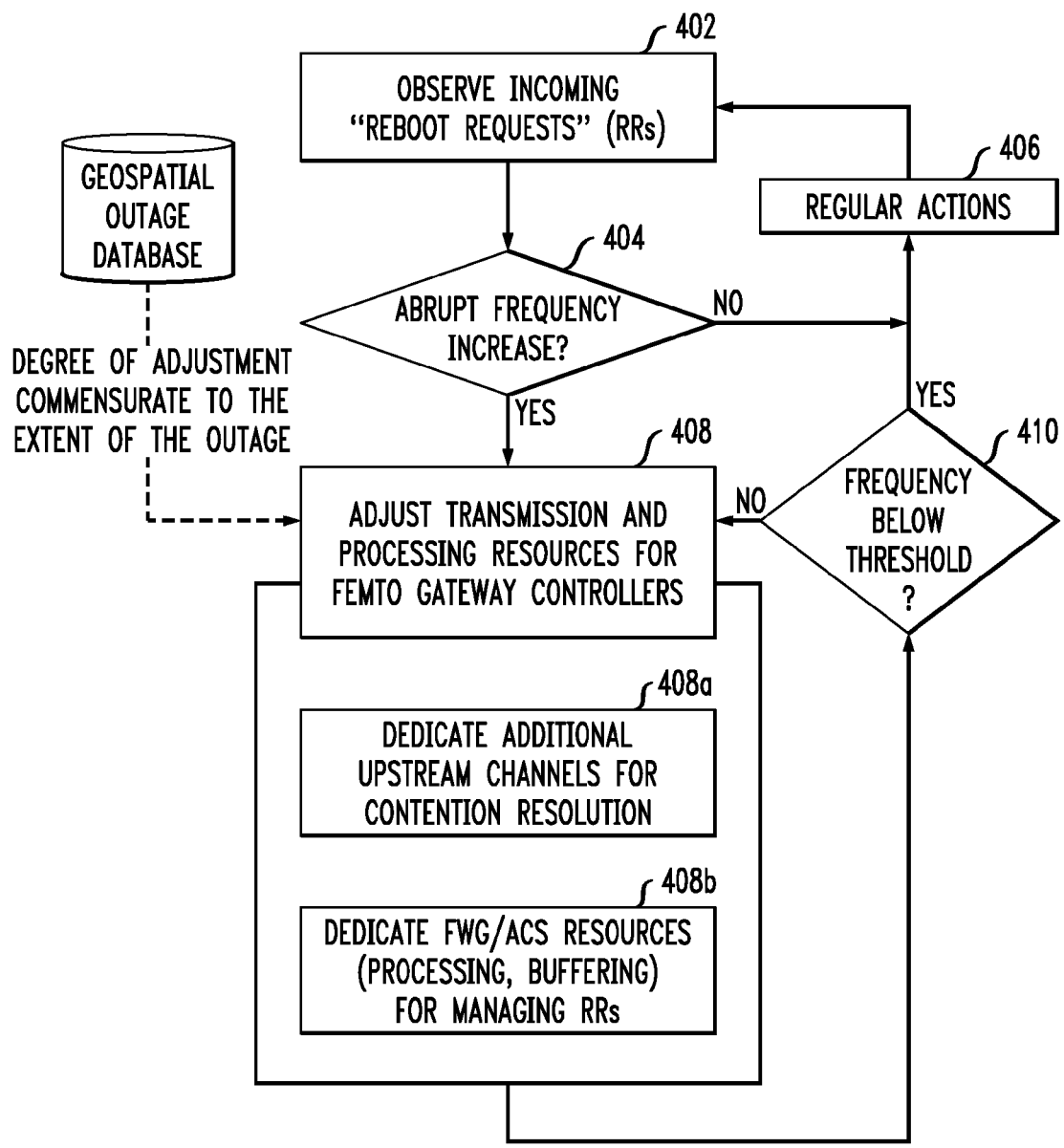
FIG. 4 is a diagram illustrating an exemplary methodology for managing a heterogeneous wireless network after a power failure once power has been restored according to an embodiment of the present invention.

FIG. 4 is a diagram illustrating exemplary methodology 400 for managing a heterogeneous wireless network having at least two classes of nodes (e.g., customer premise equipment (e.g., FAPs) and operator-owned equipment (e.g., femto gateway controllers, ACS, etc.)), such as network 100, after a power failure once power has been restored. Methodology 400 follows the same general process flow as methodology 200 (of FIG. 2). Using network 100 as an example, the steps of methodology 400 may be performed by the femto gateway controller since, when power is restored, a multitude of FAPs will send re-boot requests (RRs) as they come back on-line (i.e., when the femto gateway controller is powered again when the power is restored). The femto gateway controller processes these requests. An exemplary apparatus that may be configured to serve as the femto gateway controller and to perform the steps of methodology 400 is provided in FIG. 5, described below.

As highlighted above, a certain behavior such as an increase in the frequency of certain activities in the network is indicative of the occurrence of a disruptive event. In this example, when power is restored after a power failure there is an abrupt increase in the frequency of RRs as the FAPs come back on-line. Thus, in step 402, the femto gateway controller observes these network activities, i.e., incoming RR requests.

In step 404, a determination is made as to whether the frequency of incoming RR requests is above a certain threshold level. When the power is restored following an outage it is expected that certain network activity behavior would be observed, such as an abrupt increase in the frequency of RR requests. Similar to the case with VHRs and LUs, according to an exemplary embodiment, the operator may collect long term statistics for RRs and calculate parameters such as the mean frequency and standard deviation for these requests during normal operation. The operator can use these statistics to determine when the current flood of RRs from the power-restored FAPs has subsided and hence restore its operation and resource usage to normal levels. Likewise, the operator can use the statistics to determine when the frequency of RRs has increased abnormally, as it could happen when power is simultaneously restored to a large number of FAPs, which will then trigger the resource adjustments to be made (steps 404 and 408 in FIG. 4). Note that, for example, a FAP controller may continue to receive RRs and engage in other FAP management operations involving FAPs that do not experience power failure. Hence, when power is restored, the change in RR frequency may not necessarily be from zero to some positive number. Instead, the RR frequency may spike from some low frequency x to a higher frequency y where the values x and y may relate to the number of FAPs that were unaffected or affected by the power failure, respectively. Note that x=0 will correspond to the case where all of the FAPs associated with a specific FAP controller experience power failure.

As described above, the collection of the long term statistics may be moving averages over windows anchored on current time or recurring intervals or combinations. An example of the former (i.e., current time) would be the case where statistics for requests are collected using the requests seen over the past one day, one week, one month, etc. An example of the latter (i.e., recurring intervals) would be the case where statistics are collected using the requests seen between 8:00 am and 8:10 am every Tuesday, or every first Tuesday of a month, etc., for the past, say, one year. The duration and the frequency of the observation intervals may change per the operator's desire. The benefit of the latter recurring, piecewise monitoring, is to gauge the request statistics reflective of the daily, monthly, seasonal, etc., trends.

If the frequency of RR requests is below the threshold (i.e., the observed network activity is not exhibiting behavior indicative of the occurrence of a disruptive event), then in step 406, the femto gateway controller maintains normal network operations. On the other hand, whenever the frequency of RR requests increases above the threshold value (i.e., the observed network activity is exhibiting behavior indicative of the occurrence of a disruptive event), in step 408, the femto gateway controller adjusts its resources to accommodate the behavior, i.e., to accommodate the increased frequency of requests from those affected devices. For example, RRs are sent from a FAP to the femto gateway controller over specially designated upstream channels that are collision prone. Collision prone implies that the RRs sent from different FAPs may interfere with each other if they are transmitted at the same time. If this happens a collision occurs and a collision resolution procedure needs to be employed, such as carrier sense multiple access (CSMA), ALOHA, tree-search algorithm, etc., to resolve the collisions. While operating normally, FAPs may power-on rather randomly and quite infrequently, hence, the frequency of collisions is kept low and whenever they happen they involve a small number of collided RRs that the contention resolution algorithm can handle quite effectively. However, following power restoration, a large number of RRs could be issued over a short amount of time. In this case, collisions are guaranteed and because of the large number of collided requests the contention resolution algorithms may take a long time to resolve them. It is well known to those skilled in the art that the performance of collision resolution algorithms deteriorates fast with the number of collided transmissions involved. Hence, to increase the effectiveness of the collision resolution mechanism it is necessary to adjust the operational parameters of the collision resolution mechanism. This can be done in a number of ways. By way of example only, step 408 may itself include one or more steps 408a and 408b which may be performed independently and in any order to adjust the operational parameters of the collision resolution mechanism. For example, in step 408a, the femto gateway controller may provide temporarily (i.e., until the frequency of RRs falls below the threshold) additional upstream channels over which RRs can be sent thus spreading them across more channels and consequently decreasing the number of RRs that collide in each one of them. Furthermore, processing and buffering resources can also be adjusted (in the femto gateway controller) upon the increase of RRs, in step 408b, to the processes that handle RRs and perform operations such as authenticating the requesting device, authorizing the services, updating the status of the user equipments and FAPs in database, sending initial configuration commands to FAPs, etc. To accommodate the increased number of RRs that reach the femto gateway controller and require ACS services, additional processing and memory resources may temporarily be allocated for this purpose by, for example, allocating additional thread pools for processing RRs while suppressing those handling other non-urgent requests, increasing the memory pool for the processes that handle RRs, increasing the size, number, and priorities of the message queues that are used to accept the RRs and send the responses to FAPs, etc.

As shown in FIG. 4, the adjustment in transmission and processing resources step may be supplemented by information regarding the outage obtained, for example, from the utility company. See also FIG. 2, described above. Information from the utility company may be accessible from a geospatial outage database, which as described above may be accessed by the core network for example via the Internet. See description of FIG. 1, above. By way of example only, the information obtained from the utility company may provide guidance on the extent of the outage, e.g., the geographical area affected by the power outage, thus permitting the femto gateway controller to better gauge how much of the resources should be reallocated to deal with the outage network activity (i.e., the greater the extent of the outage, the greater the number of FAPs that will be coming back on-line once power is restored, thus the greater the number of incoming RR requests and hence the greater the amount of resources that need to be allocated to deal with these requests). The utility company might also provide information relating to when power restoration is expected at each geographical location. For example, the utility company can monitor restoration efforts in different areas and provide an estimate of when they believe (given those efforts) the power might be restored to those areas. Thus the femto gateway controller can use this information to gauge where and when to allocate resources in anticipation of a restoration event. For example, upon learning that region A has experienced a power outage, the network operator can determine, from its own knowledge of where its service subscribers' premises are located, how many of them have been affected. If for example 1,000 of its subscribers are affected, then the network operator can use this number to estimate, say, using a queuing-based capacity model, how long it will take to accommodate their requests using different levels of allowable resources and select the level to use that provides satisfactory performance.

A determination is then made in step 410 as to whether the frequency of RRs has fallen below the threshold value, see above, (signifying, e.g., that a majority of the FAPs have successfully come back on-line). If the frequency of RRs has fallen below the threshold value, then the femto gateway controller switches the transmission and processing resources back to normal operation parameters, and regular actions are resumed as per step 406. If, however, the frequency of RRs is still above the threshold value, then the adjusted resources for transmission and processing of network signaling are maintained or updated (based, for example, on updated information from the outage database related to the extent of the outage and/or projections regarding time/location of power restorations).

Methodology 300 may be performed in conjunction with methodology 400, i.e., during a power outage and after the outage once power has been restored, respectively. However, outages affecting the same network might occur at different times and/or at different locations within the network.

Figure 5:
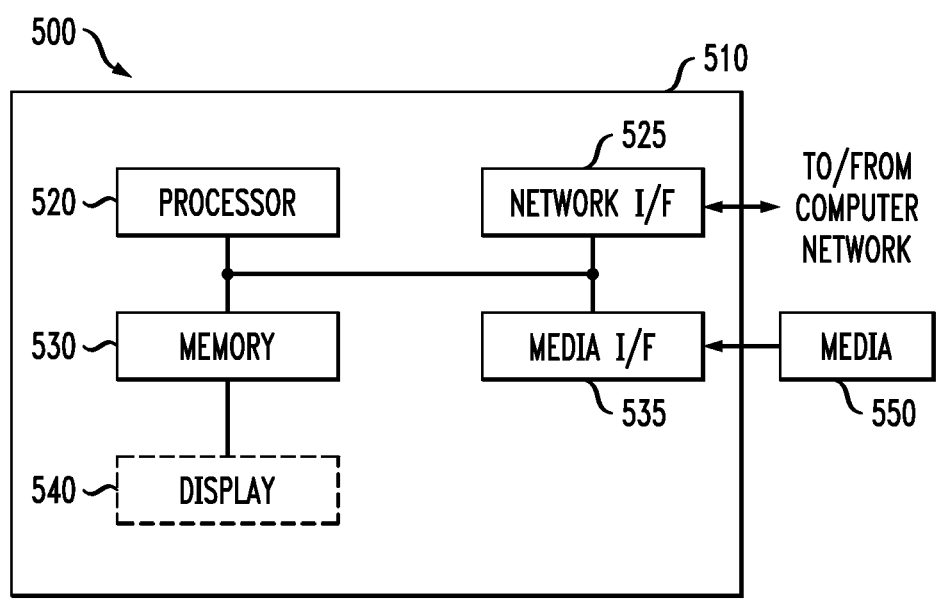
FIG. 5 is a diagram illustrating an exemplary apparatus for managing a heterogeneous wireless network having at least two classes of nodes, such as the network of FIG. 1 according to an embodiment of the present invention.

Turning now to FIG. 5, a block diagram is shown of an apparatus 500 for implementing one or more of the methodologies presented herein. By way of example only, apparatus 500 can be configured to implement one or more of the steps of methodology 200 of FIG. 2, methodology 300 of FIG. 3 and/or methodology 400 of FIG. 4 for managing a heterogeneous wireless network, having at least two classes of nodes, such as network 100 described, in conjunction with the description of FIG. 1. As highlighted above, network 100 includes at least one macrocell controller (MCC). When apparatus 500 is configured to implement the steps of methodology 300, apparatus 500 can be configured to serve as the MCC in network 100. As highlighted above, network 100 also includes at least one femto gateway controller. When apparatus 500 is configured to implement the steps of methodology 400, apparatus 500 can be configured to serve as the femto gateway controller in network 100.

Apparatus 500 comprises a computer system 510 and removable media 550. Computer system 510 comprises a processor device 520, a network interface 525, a memory 530, a media interface 535 and an optional display 540. Network interface 525 allows computer system 510 to connect to a network, while media interface 535 allows computer system 510 to interact with media, such as a hard drive or removable media 550.

As is known in the art, the methods and apparatus discussed herein may be distributed as an article of manufacture that itself comprises a machine-readable medium containing one or more programs which when executed implement embodiments of the present invention. For instance, when apparatus 500 is configured to implement one or more of the steps of methodology 200 the machine-readable medium may contain a program configured to observe one or more network signaling activities; and if the network signaling activities exhibit a behavior that is associated with a power failure affecting at least one of the classes of nodes, adjust network resources for transmission and processing of network signaling associated with one or more other of the classes of nodes to accommodate the behavior. The machine-readable medium may be a recordable medium (e.g., floppy disks, hard drive, optical disks such as removable media 550, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 520 can be configured to implement the methods, steps, and functions disclosed herein. The memory 530 could be distributed or local and the processor device 520 could be distributed or singular. The memory 530 could be implemented as an electrical, magnetic or optical memory, or any combination of these or other types of storage devices. Moreover, the term "memory" should be construed broadly enough to encompass any information able to be read from, or written to, an address in the addressable space accessed by processor device 520. With this definition, information on a network, accessible through network interface 525, is still within memory 530 because the processor device 520 can retrieve the information from the network. It should be noted that each distributed processor that makes up processor device 520 generally contains its own addressable memory space. It should also be noted that some or all of computer system 510 can be incorporated into an application-specific or general-use integrated circuit.

Optional display 540 is any type of display suitable for interacting with a human user of apparatus 500. Generally, display 540 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for managing a heterogeneous wireless network having at least two classes of nodes, comprising the steps of:
   observing one or more network signaling activities; and
   if the network signaling activities exhibit a behavior that is associated with a power failure affecting at least one of the classes of nodes, adjusting network resources for transmission and processing of network signaling associated with one or more other of the classes of nodes to accommodate the behavior.

2. The method of claim 1, wherein the behavior that is associated with the power failure comprises a frequency of the one or more network activities increasing above a threshold value.

3. The method of claim 1, wherein one of the classes of nodes comprises customer premise equipment.

4. The method of claim 3, wherein the customer premise equipment comprises a femtocell access point.

5. The method of claim 1, wherein one of the classes of nodes comprises operator-owned equipment.

6. The method of claim 5, wherein the operator-owned equipment comprises one or more of a femto gateway controller and an auto configuration server.

7. The method of claim 1, further comprising the steps of:
   obtaining information regarding an extent of the power failure; and
   adjusting the network resources for transmission and processing of network signaling based on the information regarding the extent of the power failure.

8. The method of claim 1, further comprising the steps of:
   obtaining information regarding when power might be restored; and
   adjusting the network resources for transmission and processing of network signaling based on the information regarding when the power might be restored.

9. The method of claim 1, wherein the network can be accessed through one or more femtocell access points and through one or more macrocell base stations, the method further comprising the step of:
   observing the network for an increased frequency of vertical handoff requests when the femtocell access points lose power due to the power failure and connection to the network transfers to the macrocell base station.

10. The method of claim 9, wherein the macrocell base stations are linked to and controlled by a macrocell controller and wherein the step of adjusting the network resources for transmission and processing of network signaling comprises the step of:
    adjusting resources for transmission and processing of network signaling in the macrocell controller.

11. The method of claim 10, wherein the step of adjusting the resources for transmission and processing of network signaling in the macrocell controller comprises the step of:
    dedicating additional access channels in the macrocell base stations.

12. The method of claim 10, wherein the step of adjusting the resources for transmission and processing of network signaling in the macrocell controller comprises the step of:
    dedicating additional bandwidth in links between the macrocell base stations and the macrocell controller.

13. The method of claim 10, wherein the step of adjusting the resources for transmission and processing of network signaling in the macrocell controller comprises the step of:
    dedicating additional processing and buffering resources to the macrocell controller.

14. The method of claim 1, wherein the network can be accessed through one or more femtocell access points and through one or more macrocell base stations, the method further comprising the step of:
    monitoring the network for an increased frequency of reboot requests when the femtocell access points are powered again when power is restored.

15. The method of claim 14, wherein access to the network through the femtocell access points is controlled by a femto gateway controller, and wherein the step of adjusting the network resources for transmission and processing of network signaling comprises the step of:
    adjusting resources for transmission and processing of network signaling in the femto gateway controller.

16. The method of claim 15, wherein the step of adjusting the resources for transmission and processing of network signaling in the femto gateway controller comprises the step of:
    dedicating additional upstream channels in the femto gateway controller for contention resolution.

17. The method of claim 15, wherein the step of adjusting the resources for transmission and processing of network signaling in the femto gateway controller comprises the step of:
    dedicating processing and buffering resources to accommodate the increased frequency of reboot requests.

18. An apparatus for managing a heterogeneous wireless network having at least two classes of nodes, the apparatus comprising:
    a memory; and
    at least one processor device, coupled to the memory, operative to:
      observe one or more network signaling activities; and
      if the network signaling activities exhibit a behavior that is associated with a power failure affecting at least one of the classes of nodes, adjust network resources for transmission and processing of network signaling associated with one or more other of the classes of nodes to accommodate the behavior.

19. The apparatus of claim 18, wherein the behavior that is associated with the power failure comprises a frequency of the one or more network activities increasing above a threshold value.

20. The apparatus of claim 18, wherein the at least one processor device is further operative to:
    obtain information regarding an extent of the power failure; and
    adjust the network resources for transmission and processing of network signaling based on the information regarding the extent of the power failure.

21. The apparatus of claim 18, wherein the at least one processor device is further operative to:
    obtain information regarding when power might be restored; and
    adjust the network resources for transmission and processing of network signaling based on the information regarding when the power might be restored.

22. An article of manufacture for managing a heterogeneous wireless network having at least two classes of nodes comprising a non-transitory machine-readable recordable medium containing one or more programs which when executed implement the steps of:
    observing one or more network signaling activities; and
    if the network signaling activities exhibit a behavior that is associated with a power failure affecting at least one of the classes of nodes, adjusting network resources for transmission and processing of network signaling associated with one or more other of the classes of nodes to accommodate the behavior.

23. The article of manufacture of claim 22, wherein the behavior that is associated with the power failure comprises a frequency of the one or more network activities increasing above a threshold value.

24. The article of manufacture of claim 22, wherein the one or more programs which when executed further implement the steps of:
- obtaining information regarding an extent of the power failure; and
- adjusting the network resources for transmission and processing of network signaling based on the information regarding the extent of the power failure.

25. The article of manufacture of claim 22, wherein the one or more programs which when executed further implement the steps of:
- obtaining information regarding when power might be restored; and
- adjusting the network resources for transmission and processing of network signaling based on the information regarding when the power might be restored.

\* \* \* \* \*